US008019338B2

(12) United States Patent
Malaga et al.

(10) Patent No.: US 8,019,338 B2
(45) Date of Patent: Sep. 13, 2011

(54) RECONFIGURABLE AIRCRAFT COMMUNICATIONS SYSTEM WITH INTEGRATED AVIONICS COMMUNICATION ROUTER AND AUDIO MANAGEMENT FUNCTIONS

(75) Inventors: Alfonso Malaga, Sammamish, WA (US); Tom D. Judd, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 696 days.

(21) Appl. No.: 12/129,213

(22) Filed: May 29, 2008

(65) Prior Publication Data
US 2009/0298451 A1 Dec. 3, 2009

(51) Int. Cl.
*H04W 4/00* (2009.01)
*H04K 3/00* (2006.01)

(52) U.S. Cl. .................. 455/431; 455/66.1; 455/73

(58) Field of Classification Search .............. 455/66.1, 455/73, 103, 132, 431
See application file for complete search history.

(56) References Cited

U.S. PATENT DOCUMENTS

| | | | |
|---|---|---|---|
| 4,404,685 A | 9/1983 | Rogers | |
| 4,982,193 A | 1/1991 | Saul | |
| 5,280,636 A | 1/1994 | Kelley et al. | |
| 5,317,323 A | 5/1994 | Kennedy et al. | |
| 5,424,674 A | 6/1995 | Skudera, Jr. et al. | |
| 5,467,399 A | 11/1995 | Whitecar | |
| 5,548,839 A | 8/1996 | Caldwell et al. | |
| 5,606,740 A | 2/1997 | Niratsuka et al. | |
| 5,640,694 A | 6/1997 | Milton, Jr. | |
| 5,659,546 A | 8/1997 | Elder | |
| 5,694,356 A | 12/1997 | Wong et al. | |
| 5,771,396 A | 6/1998 | Arnold | |
| 5,822,366 A | 10/1998 | Rapeli | |
| 5,859,878 A | 1/1999 | Phillips et al. | |
| 5,861,831 A | 1/1999 | Murden et al. | |
| 5,870,402 A | 2/1999 | Kelley | |
| 5,898,907 A | 4/1999 | Maruyama | |
| 5,909,193 A | 6/1999 | Phillips et al. | |
| 5,930,310 A | 7/1999 | Freeman | |

(Continued)

FOREIGN PATENT DOCUMENTS
EP 1168637 1/2002
(Continued)

OTHER PUBLICATIONS

"Analog Devices", "Manufacturer Data Sheet", Mar. 26, 2001, Publisher: VersaCOMM Digital Converters.

(Continued)

*Primary Examiner* — Lee Nguyen
(74) *Attorney, Agent, or Firm* — Fogg & Powers LLC (57) ABSTRACT

A reconfigurable radio communication subsystem is provided comprising a first radio communication unit communicatively coupled to a first antenna and a second antenna, and a second radio communication unit communicatively coupled to a third antenna and the first or second antenna. The first, second, and third antennas are operable in a first frequency band. The subsystem includes a first antenna subsystem coupled to the first radio communication unit and a fourth antenna operable in a second frequency band, and a second antenna subsystem coupled to the second radio communication unit and the fourth antenna. The first and second radio communication units include reconfigurable voice/data functions operating in the first frequency band, voice/data functions operating in the second frequency band, and a radio communications system management function. Cross-connecting buses couple the first radio communication unit and the second radio communication unit.

18 Claims, 8 Drawing Sheets

U.S. PATENT DOCUMENTS

| | | | |
|---|---|---|---|
| 5,930,682 | A | 7/1999 | Schwartz et al. |
| 5,936,571 | A | 8/1999 | Desjardins |
| 6,069,583 | A | 5/2000 | Silvestrin et al. |
| 6,072,994 | A | 6/2000 | Phillips et al. |
| 6,075,808 | A | 6/2000 | Tsujimoto |
| 6,112,141 | A | 8/2000 | Briffe et al. |
| 6,144,331 | A | 11/2000 | Jiang |
| 6,151,354 | A | 11/2000 | Abbey |
| 6,185,248 | B1 | 2/2001 | Wiegand |
| 6,185,434 | B1 | 2/2001 | Hagstrom et al. |
| 6,205,133 | B1 | 3/2001 | Bexten |
| 6,282,184 | B1 | 8/2001 | Lehman et al. |
| 6,307,497 | B1 | 10/2001 | Leung et al. |
| 6,334,051 | B1 | 12/2001 | Tsurumi et al. |
| 6,337,885 | B1 | 1/2002 | Hellberg |
| 6,384,681 | B1 | 5/2002 | Bonds |
| 6,415,001 | B1 | 7/2002 | Li et al. |
| 6,473,596 | B1 | 10/2002 | Stamper et al. |
| 6,477,359 | B2 | 11/2002 | Heppe et al. |
| 6,480,555 | B1 | 11/2002 | Renard et al. |
| 6,496,546 | B1 | 12/2002 | Allpress et al. |
| 6,574,459 | B1 | 6/2003 | Kaminski et al. |
| 6,639,537 | B1 | 10/2003 | Raz |
| 6,678,512 | B1 | 1/2004 | Kaminski et al. |
| 6,898,235 | B1 | 5/2005 | Carlin et al. |
| 6,914,950 | B1 | 7/2005 | Luneau |
| 6,944,475 | B1 | 9/2005 | Campbell |
| 7,200,377 | B2 | 4/2007 | Whikehart et al. |
| 7,605,757 | B1 | 10/2009 | Gribble et al. |
| 2002/0004411 | A1 | 1/2002 | Heppe et al. |
| 2002/0082008 | A1* | 6/2002 | Nelson ............... 455/431 |
| 2002/0118784 | A1 | 8/2002 | Teo et al. |
| 2002/0173341 | A1 | 11/2002 | Abdelmonem et al. |
| 2002/0177446 | A1 | 11/2002 | Bugeja et al. |
| 2002/0193090 | A1 | 12/2002 | Sugar et al. |
| 2003/0072320 | A1 | 4/2003 | Seo et al. |
| 2004/0210932 | A1 | 10/2004 | Mori |
| 2005/0020238 | A1 | 1/2005 | Eastman |
| 2005/0089083 | A1 | 4/2005 | Fisher |
| 2006/0005055 | A1 | 1/2006 | Potega |
| 2006/0015674 | A1 | 1/2006 | Murotake |
| 2006/0135143 | A1 | 6/2006 | Suematsu |
| 2006/0194611 | A1 | 8/2006 | Pasternak |
| 2007/0150631 | A1 | 6/2007 | Druke |
| 2009/0017777 | A1 | 1/2009 | Malaga |

FOREIGN PATENT DOCUMENTS

| | | | |
|---|---|---|---|
| EP | 1168646 | | 1/2002 |
| EP | 1429118 | * | 6/2004 |
| WO | 9941851 | | 8/1999 |
| WO | 0225304 | | 3/2002 |

OTHER PUBLICATIONS

"Four-Channel, 100 MSPS Digital Receive Signal Processor (RSP)", "AD6624A Data Sheet", 2002, pp. 1-39, Publisher: Analog Devices Inc.

Brannon et al., "Soft Radio runs into Hard Standards", "EE Times", Mar. 19, 2001.

Brannon, "Basics of Designing a Digital Radio Receiver (Radio 101)", "RF Microwave Wireless High Frequency", May 1995, pp. 1-10, Publisher: RF Cafe.

Brannon, "Designing a Super-Heterodyne Multi-Channel Digital Receiver", "Manufacturer Application Note", Jan. 1, 2000.

"Series III Avionics Pilot's Guide", 2000, Publisher: Chelton Avionics Inc.

McCann et al., "DSP Brings Base Station SDR Reality", Sep. 2004, pp. 50-56, Publisher: RF Design Magazine.

Satkunanathan et al., "Satellite-Based Guidance for Precision Approach and Landing of Commercial Aircraft", 1998, Publisher: GPS Solutions.

Oczak, "Navigation and Communication System", 2000.

O'Shea, "What's Up with Down Converters", Nov. 1, 2005, Publisher: www.eeproductcenter.com.

"VersaCOMM Digital Converters", "www.analog.com/VersaCOMM", 2000, Publisher: Analog Devices.

* cited by examiner

RECONFIGURABLE AIRCRAFT COMMUNICATIONS SYSTEM WITH INTEGRATED AVIONICS COMMUNICATION ROUTER AND AUDIO MANAGEMENT FUNCTIONS

CROSS REFERENCE TO RELATED APPLICATION

This application is related to U.S. patent application Ser. No. 11/777,468 having a title of "RECONFIGURABLE AIRCRAFT RADIO COMMUNICATIONS SYSTEM" (also referred to here as the "'468 Application"), filed on Jul. 13, 2007. The '468 Application is incorporated herein by reference.

BACKGROUND

Commercial air transport aircraft are equipped with multiple (3) fully functioning very high frequency (VHF) range radios to provide for voice and short-message data communication between the pilots and ground based air traffic controllers, and/or airline-dispatch-operation controllers when flying overland. Similarly multiple (2) high frequency (HF) range radios and a multi-channel (4) satellite communication (SATCOM) radio provide for voice and data communications between the pilots and ground controllers when flying over oceanic routes or remote areas where VHF radio coverage is not available. An avionics data communications router (ACR) on board the aircraft manages the down linking of data messages over the appropriate communications link based on link availability and routing policies. The avionics data communications router also manages the delivery of data received via any of the radio communications links to the appropriate end system on board the aircraft.

Similarly an audio management unit (AMU) switches/routes the voice audio received over a selected VHF, HF or SATCOM radio channel to the appropriate headset and/or speaker in the cockpit. The audio management unit also switches/routes the microphone audio to the selected VHF, HF or SATCOM radio. Up to 3 radio control panels (RCP) in the cockpit are operable to select the mode of operation (voice or data) and the operating frequency of the 3 VHF radios and 2 HF radios when voice mode is selected. The radio control panels are also operable to select the "called party" telephone number when a voice call is to be placed over one of the SATCOM radio voice channels. Similarly 3 or more audio control panels in the cockpit are operable to select the VHF, HF or SATCOM radio whose voice audio output is to be switched/routed to a particular headset/microphone audio jack or speaker in the cockpit. The control/selection functions performed by a radio control panel and an audio control panel may be combined into a single radio management panel (RMP). The number of line replaceable units (also referred to herein as "boxes") required to provide this capability is relatively high and drives up the cost, weight, and volume of the system. The inter-wiring between the boxes adds to the weight of the system and the more wiring there is, the greater the complexity and cost of installing the system. Fewer boxes and simpler inter-wiring is desirable.

SUMMARY

The present application relates to a reconfigurable radio communication subsystem. The reconfigurable radio communication subsystem comprises a first radio communication unit communicatively coupled to a first antenna and a second antenna, and a second radio communication unit communicatively coupled to a third antenna and either one of the first antenna or the second antenna. The first, second, and third antennas are operable in a first frequency band. The reconfigurable radio communication subsystem also comprises a first antenna subsystem communicatively coupled to the first radio communication unit and communicatively coupled to a fourth antenna, and a second antenna subsystem communicatively coupled to the second radio communication unit and communicatively coupled to the fourth antenna. The fourth antenna is operable in a second frequency band. The first and second radio communication units each include one or more reconfigurable voice/data functions operating in the first frequency band, one or more voice/data functions operating in the second frequency band, and a radio communications system management function. The first radio communication unit and the second radio communication unit each further include an avionics data communications router function and/or an audio management function. Cross-connecting buses communicatively couple the first radio communication unit and the second radio communication unit.

DRAWINGS

In accordance with common practice, the various described features are not drawn to scale but are drawn to emphasize features relevant to the present invention. Like reference characters denote like elements throughout the figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present invention describes a communication system architecture to reduce the number of line replaceable units in order to simplify the wiring between the line replaceable units while maintaining or improving the system reliability (i.e., communications availability) and while reducing the overall cost, weight, and volume of the communication system. Specifically, the reconfigurable radio communication system described herein is capable of supporting simultaneous voice and data communications on multiple channels in a first frequency band and multiple channels in a second frequency band while tolerating any single fault in any of its subsystem components without loss of functionality. The first and second frequency bands can be any non-overlapping bands of frequencies. In one implementation of this embodiment, the first frequency band is a very high frequency (VHF) band and the second frequency band is a high frequency (HF) band. As defined herein, the VHF band extends from 118-156 MHz and the HF band extends from 2-30 MHz. Other frequency bands can be used, though most of the discussion herein focuses on the VHF and HF frequency bands.

For example, each radio communication unit can be used to support simultaneous operation on up to three very high frequency (VHF) channels (e.g., two voice and one data or three voice channels), up to two high frequency (HF) channels (e.g., one voice and one data or two voice channels), three satellite communication (SATCOM) channels (e.g., two voice and one data channel), an avionics communication router function (ACRF), and an audio management function (AMF). The multi-function radio communication units described herein eliminate several boxes by performing much of the VHF and HF channel processing digitally in software, by sharing processors to perform at least two channel functions per processor, and by integrating the avionics communication router function and audio management function. The integration of the avionics communication router function, which is a software function, into the radio communication unit eliminates two boxes from the architecture, and simplifies the aircraft wiring. Likewise, the integration of the audio management function, which is also a software function, into the radio communication unit eliminates two additional boxes from the architecture, and simplifies the aircraft wiring even more. Two radio communication units provide the necessary redundancy, which, when combined with software controlled reconfiguration, results in better availability than a system comprised of separate line replaceable units for each communication function. The internal redundancy of each radio communication unit and the inter-connections among radio communication units, HF antenna subsystems and VHF antennas are such that no single failure in a radio communication unit or HF antenna subsystem results in loss of any of the VHF, HF and SATCOM voice or data functions. The fault tolerance is achieved with minimal internal redundancy.

The reconfigurable radio communication subsystem described herein includes a first radio communication unit communicatively coupled to two very high frequency antennas, a second radio communication unit communicatively coupled to a very high frequency antenna. In one implementation of this embodiment, the second radio communication unit is communicatively coupled to either of the very high frequency antennas to which the first radio communications unit is coupled. The reconfigurable radio communication subsystem also includes a first high frequency antenna subsystem communicatively coupled to the first radio communication unit and communicatively coupled to a high frequency antenna. The reconfigurable radio communication subsystem also includes a second high frequency antenna subsystem communicatively coupled to the second radio communication unit and communicatively coupled to the same high frequency antenna. The first and second radio communication units each include one or more reconfigurable VHF radio functions, one or more HF radio functions, a radio communications system management function, The reconfigurable radio communication subsystem also includes cross-connecting buses communicatively coupling the radio communications units. In one implementation of this embodiment, the first and second radio communication units each include an avionics data communications router function and an audio management function. In another implementation of this embodiment, the first and second radio communication units only include an avionics data communications router function or only an audio management function.

Figure 1:
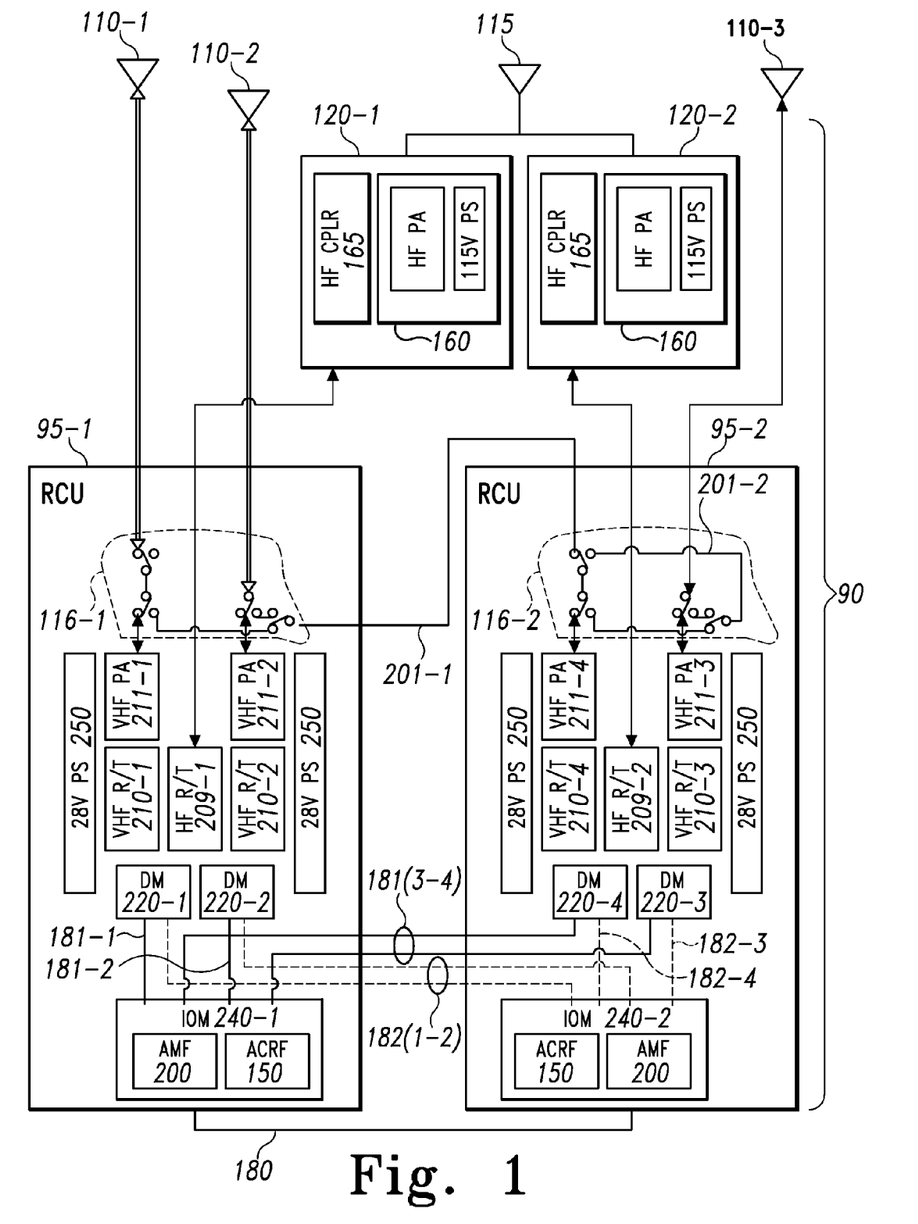
FIG. 1 is a block diagram of a reconfigurable radio communication subsystem in accordance with one embodiment of the present invention.

FIG. 1 is a block diagram of a reconfigurable radio communication subsystem 90 in accordance with one embodiment of the present invention. The radio communication subsystem 90 includes two radio communication units (RCU) 95-1 and 95-2, and two HF antenna subsystems 120-1 and 120-2. The radio communication subsystem 90 is communicatively coupled to three VHF antennas 110(1-3), and one HF antenna 115.

For an embodiment that is operable for a first frequency band that is other than the VHF frequency band and that is operable for a second frequency band that is other than the HF frequency band, the radio communication subsystem 90 includes two radio communication units (RCU) 95-1 and 95-2, and two antenna subsystems 120-1 and 120-2 operable at the second frequency range. In such an embodiment, the radio communication subsystem 90 is communicatively coupled to three antennas 110(1-3) operable in the first frequency band, and one antenna 115 operable in the second frequency band. The first and second radio communication units in such a system each include one or more reconfigurable voice/data functions operating in the first frequency band, one or more voice/data functions operating in the second frequency band, and a radio communications system management function. The first radio communication unit and the second radio communication unit each further include an avionics data communications router function and/or an audio management function. Cross-connecting buses communicatively couple the first radio communication unit and the second radio communication unit.

As shown in FIG. 1, the first radio communication unit 95-1 is communicatively coupled to the first HF antenna subsystem 120-1, which is communicatively coupled to the HF antenna 115. The second radio communication unit 95-2 is communicatively coupled to the second HF antenna subsystem 120-2, which is also communicatively coupled to the HF antenna 115. The HF antenna subsystems 120(1-2) each include a HF coupler 165, and a combined HF power amplifier/internal power supply (PS) module 160. Since the two HF antenna subsystems 120(1-2) are connected to one HF antenna 115, only the HF function in radio communications unit 95-1 or the HF function in radio communications unit 95-2 can transmit at a time but both HF functions can receive simultaneously.

The first radio communication unit 95-1 includes two VHF transceivers (R/T) 210-1 and 210-2 associated with a respective VHF power amplifier (PA) 211-1 and 211-2. The second radio communication unit 95-2 includes two VHF transceivers (R/T) 210-3 and 210-4 associated with a respective VHF power amplifier (PA) 211-3 and 211-4. The first radio communication unit 95-1 and the second radio communication unit 95-2 each include a HF transceiver (R/T) 209, two digital signal processing modules (DM) 220, an input/output module (IOM) 240 and two power supply modules 250. The IOM 240 described in this application includes an avionics communication router function (ACRF) 150 and an audio management function (AMF) 200 in addition to the control and reconfiguration functions described in the related '468 Application. The first radio communication unit 95-1 and the second radio communication unit 95-2 also include VHF antenna switch systems 116-1 and 116-2, respectively. The radio communication units 95(1-2) are one type of line replaceable units. The HF antenna subsystems 120(1-2) are another type of line replaceable units.

In one implementation of this embodiment, the first radio communication unit 95-1 is directly connected to the first VHF antenna 110-1 and the second VHF antenna 110-2 while the second radio communication unit 95-2 is directly connected to the third VHF antenna 110-3. Cross-connect bi-directional buses 181(1-4) and 182(1-4) route audio, digital data, and radio function control within each radio communication unit 95(1-2) and between the radio communication unit 95-1 and radio communication unit 95-2. The cross-connect bi-directional bus 180 is used to send management data between radio communication unit 95-1 and radio communication unit 95-2 to coordinate master/slave responsibilities for the reconfiguration of the radio communication subsystem 90. The "master/slave" coordination between radio communications system management applications hosted in each input/output module is used determine which of the applications is in control of system configuration/re-configuration.

In this manner, the first radio communication unit 95-1 and the second radio communication unit 95-2 are communicatively coupled to each other to send audio and digital data signals to the VHF transceivers 210(1-4), HF transceivers 209(1-2) and VHF antennas 110(1-3) and/or HF antenna 115 that are not directly linked to the radio communication unit 95-1 or 95-2. In one implementation of this embodiment, the buses 182(1-4) include at least one point-to-point serial data bus. In one implementation of this embodiment, multiple point-to-point serial data buses are included to ensure that a failure in a bus does not result in loss of functionality.

VHF antenna switch systems 116(1-2) are operable to reconfigure spare VHF transceiver 210-4 and VHF power amplifier 211-4 as hot spares for any of the other three VHF transceivers 210-1, 210-2 or 210-3 and VHF power amplifiers 211-1, 211-2, and 211-3 in either radio communication unit 95-1 or 95-2 as described in the related '468 Application. The connections 201-1 and 201-2 that communicatively couple the switch systems 116-1 and 116-2 are implemented to provide this reconfiguration. The VHF antenna switch systems 116-1 and 116-2 form a switch matrix. During normal operation, when all the VHF transceivers, amplifiers, and digital signal processing modules are fully functional (i.e., no failures are present) the VHF antenna switch systems 116-1 and 116-2 connect:

1) the digital signal processing module 220-1, VHF transceiver 210-1, and the amplifier 211-1 to the VHF antenna 110-1;

2) the digital signal processing module 220-2, the VHF transceiver 210-2, and the amplifier 211-2 to the VHF antenna 110-2; and 3) the digital signal processing module 220-3, the VHF transceiver 210-3, and the amplifier 211-3 to the VHF antenna 110-3. In this configuration, the VHF transceiver 210-1 and the amplifier 211-1 are not connected to any VHF antenna 110-1. When a failure is detected in one of the VHF transceivers 210(1-3), the amplifiers 211(1-3) or the digital signal processing modules 220(1-3), the VHF antenna switch systems 116-1 and 116-2 are reconfigured to disconnect the failed VHF transceiver/amplifier/digital signal processing module-trio from the antenna and to connect the standby VHF transceiver/amplifier/digital signal processing module to that antenna.

Each input/output module 240 comprises a programmable digital signal processor, a programmable general purpose processor, memory, complex programmable logic device(s), analog audio coding/decoding devices, application specific integrated circuit to interface to a broadband avionics data bus (e.g. AFDX transceiver), ARINC 429 serial bus transceivers, miscellaneous external input/output circuitry, and application software to perform various functions further specified the following claims.

When a failure is detected in one of the VHF transceivers 210(1-3), the amplifiers 211(1-3) or the digital signal processing modules 220(1-3), the VHF antenna switch systems 116-1 and 116-2 are reconfigured to disconnect the failed VHF transceiver/amplifier/digital signal processing module-trio from the antenna and to connect the standby VHF transceiver/amplifier/digital signal processing module to that antenna.

Each VHF transceiver 210(1-4) and VHF power amplifier 211(1-4) can receive on at least two VHF channels simultaneously or can transmit on one VHF channel at a time. Similarly, each HF transceiver 209 and HF antenna subsystem 120(1-2) can receive on at least two HF channels simultaneously or can transmit on one HF channel at a time. Each DM 220 can process at least 2 VHF channels and 1 HF channel simultaneously. Therefore, it is possible for both radio communications unit 95-1 and radio communications unit 95-2, together with their respective HF antenna subsystems 120(1-2), to simultaneously receive on the same three VHF channels and 2 HF channels. Each radio communications unit 95(1-2) together with its respective HF antenna subsystem 120(1-2) is capable of transmitting on two VHF channels and one HF channel simultaneously. Simultaneous transmission on 3 VHF channels or simultaneous transmission on 2 VHF channels and reception on a third VHF channel requires the utilization of both radio communications units 95(1-2). The input/output module 240-1 (and the ACRF 150 and AMF 200 functions within it) in radio communications unit 95-1 and the input/output module 240-2 in radio communications unit 95-2 can both process the audio and data for all 3 VHF and 2 HF functions simultaneously and can be supplied with power by either of the two internal power supplies 250.

No single module failure within a radio communications unit 95(1-2), or single failure of any of the point-to-point serial buses 181(1-4) and 182(1-4), or failure within a HF antenna subsystem 120(1-2) results in loss of any of the 3 VHF and 2 HF functions. Moreover, a single VHF antenna failure or a complete loss of one radio communications unit 95 results only in the loss of the capability to transmit on all three VHF functions simultaneously. In the event of such a loss, the radio communication subsystem 90 retains the capability to: 1) receive on all 3 VHF channels simultaneously; 2) transmit on any two VHF channels and receive on the third VHF channel; 3) transmit on any one VHF channel and receive on the other two VHF channels; and 4) transmit on one HF channel or receive on 2 HF channels.

Figure 2:
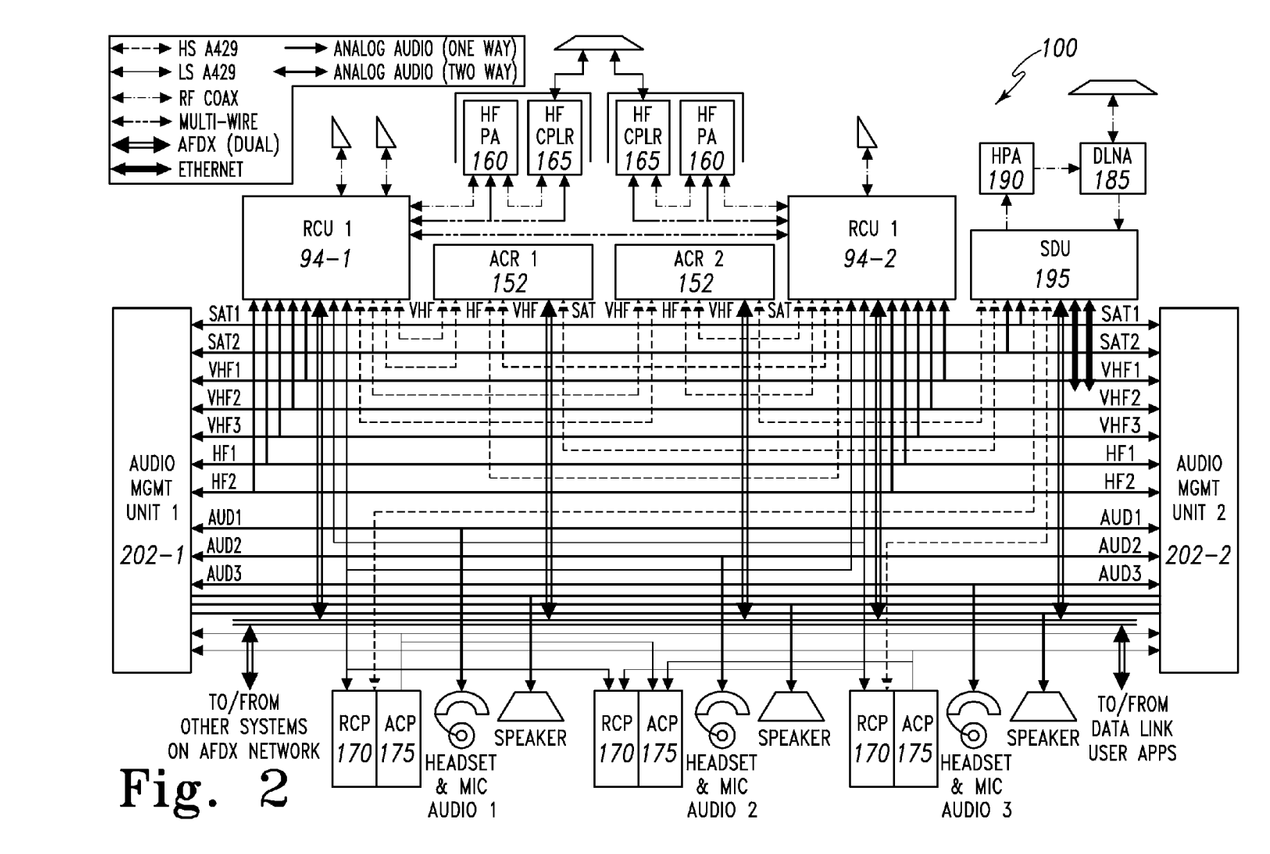
FIG. 2 is a block diagram of a radio communication system.

FIG. 2 is a block diagram of a radio communication system 100. The radio communication system 100 shows the wiring for communicatively coupling the radio communication subsystem described in the related '468 Application. The radio communication system 100 is communicatively coupled to the avionics communication routers (ACR) 152 and audio management units (AMU) 202(1-2) that are external to the radio communication units 95-1 and 95-2 as described in the '468 Application.

In this embodiment, a software application is hosted in each input/output module 240(1-2) to perform the avionics data communications router functions (described above with reference to FIG. 1) while the radio communications units 95(1-2) interfaces to external audio management units 202(1-2). Likewise, a software application is hosted in each input/output module 240(1-2) to perform the audio management function (described above with reference to FIG. 1) while the radio communications units 95(1-2) interfaces to external avionics data communications router units 152.

Figure 3:
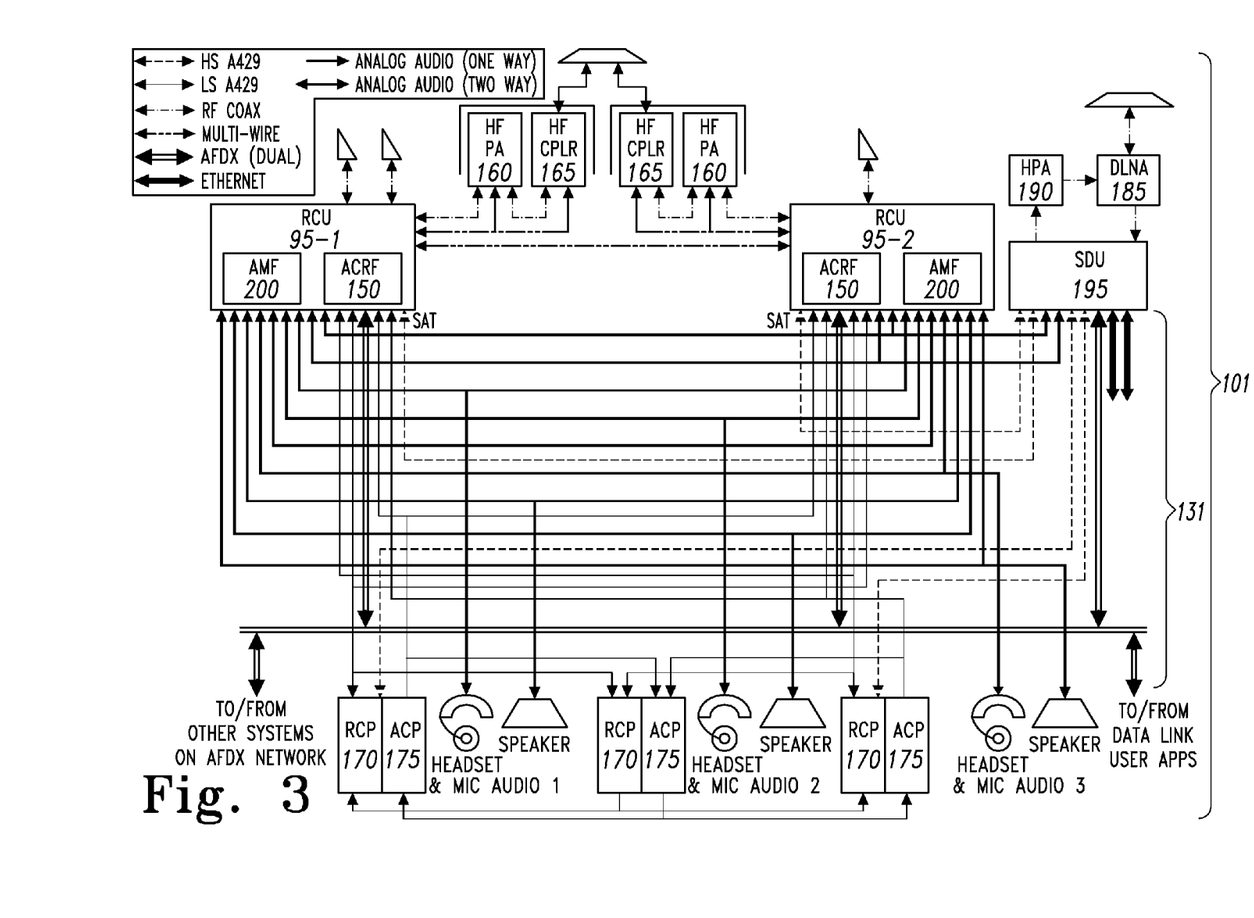
FIG. 3 is a block diagram of a radio communication system in accordance with one embodiment of the present invention that utilizes the reconfigurable radio communication subsystem of FIG. 1.

FIG. 3 is a block diagram of a radio communication system 101 in accordance with one embodiment of the present invention that utilizes the radio communication subsystem 90 of FIG. 1. Radio communication system 101 differs from the radio communication system 100 of FIG. 2, in that the avionics data communications router function (ACRF) and audio management function (AMF) function are integrated into the radio communication units 95(1-2) in the radio communication system 101. Because of this integration, there are fewer boxes in the radio communication system 101 and less wiring in the point-to-point audio interconnections and serial data buses represented generally at 131 used in the radio communication system 101 than in the radio communication system 100. The various types of communication links between components of radio communication system 101 are indicated by the key in the upper left hand corner of FIG. 3.

The radio communication system 101 provides HF, VHF and SATCOM voice and data link communications to the cockpit of an aircraft in which the radio communication system 101 is located. The radio communication system 101 includes the radio communication units 95(1-2), HF power amplifiers 160, and HF couplers (CPLR) 165, SATCOM data unit (SDU) 195, high power amplifier (HPA) 190, and diplexer/low noise amplifier (DLNA) 185.

The dual radio communication units 95(1-2) in the radio communication system 101 each include avionics communication router functions 150 and audio management functions 200 that are integrated in the radio communication units 95(1-2). The radio communications system 101 is communicatively coupled to the HF, VHF and SATCOM antennas and to headsets, microphones and speakers in the cockpit, and to various data link user applications that may reside in one or more boxes in the aircraft. The headsets and speakers are the devices used by the crew to hear the voice audio received on any of the HF, VHF or SATCOM radio channels that are operating in voice mode. The microphones are the devices used by the crew to speak into and initiate transmission of voice audio over any of the HF, VHF or SATCOM radio channels that are operating in voice mode.

The audio management function 200 that is integrated into the radio communications unit 95(1-2) switches/routes the audio from each headset/microphone and speaker to the appropriate HF, VHF, or SATCOM radio channel based on control inputs received from the cockpit. The data link user applications are software applications that send and receive data messages over any of HF, VHF or SATCOM radio channels that are operating in data mode. The avionics data communications router function 150 that is integrated into each radio communications unit 95(1-2) routes the data messages received over the VHF, HF or SATCOM radio channels operating in data mode to the appropriate data link user application and sends data messages received from the data link user applications to the appropriate VHF, HF or SATCOM radio channel based on predefined routing policies and air/ground link availability.

The radio communication system 101 interfaces to radio control panels (RCP) 170 and audio control panels (ACP) 175 that allow the pilots to control the radio functions and audio functions, respectively, of the radio communications system.

A radio control panel 170 and audio control panel 175 may be integrated into a single radio management panel that performs the radio control and audio control functions. The radio control panel (RCP) 170 (or a radio control function of a radio management panel) in the radio communication system 101 is operable to select the mode of operation (voice or data) of any HF or VHF function and to select the HF or VHF channel (operating frequency) of any function for which voice mode is selected. The radio control panel 170 is also operable to initiate a phone call using a SATCOM voice channel. The audio control panel 175 (or the audio control function of a radio management panel) is operable to select the audio associated with any of the HF, VHF or SATCOM radio functions/channels that are operating in voice mode to any of the headset/microphones or speakers in the cockpit.

The radio communication system 101 shown in FIG. 3 requires fewer boxes and less wiring than the radio communication system 100 shown in FIG. 2. In particular, the configuration of the radio communication system 101 shown in FIG. 3 eliminates the following boxes and wires (that are shown in the radio communication system 100 of FIG. 2): external avionics data communications routers 152 and external audio management units 202; all the VHF and HF audio lines between the radio communications units 95(1-2); the external audio management units 202; the ARINC 429 data bus connections between the radio communications units 95(1-2) and the avionics data communications routers 152; the high-speed Ethernet-like AFDX bus connections between the avionics data communications routers 152 and the AFDX network switches. The radio communication system 101 as shown in FIG. 3, maintains the same interconnections with the radio control panels 170, audio control panels 175, headsets, microphones and speakers in the cockpit as the radio communications system 100 (FIG. 2).

Figure 4:
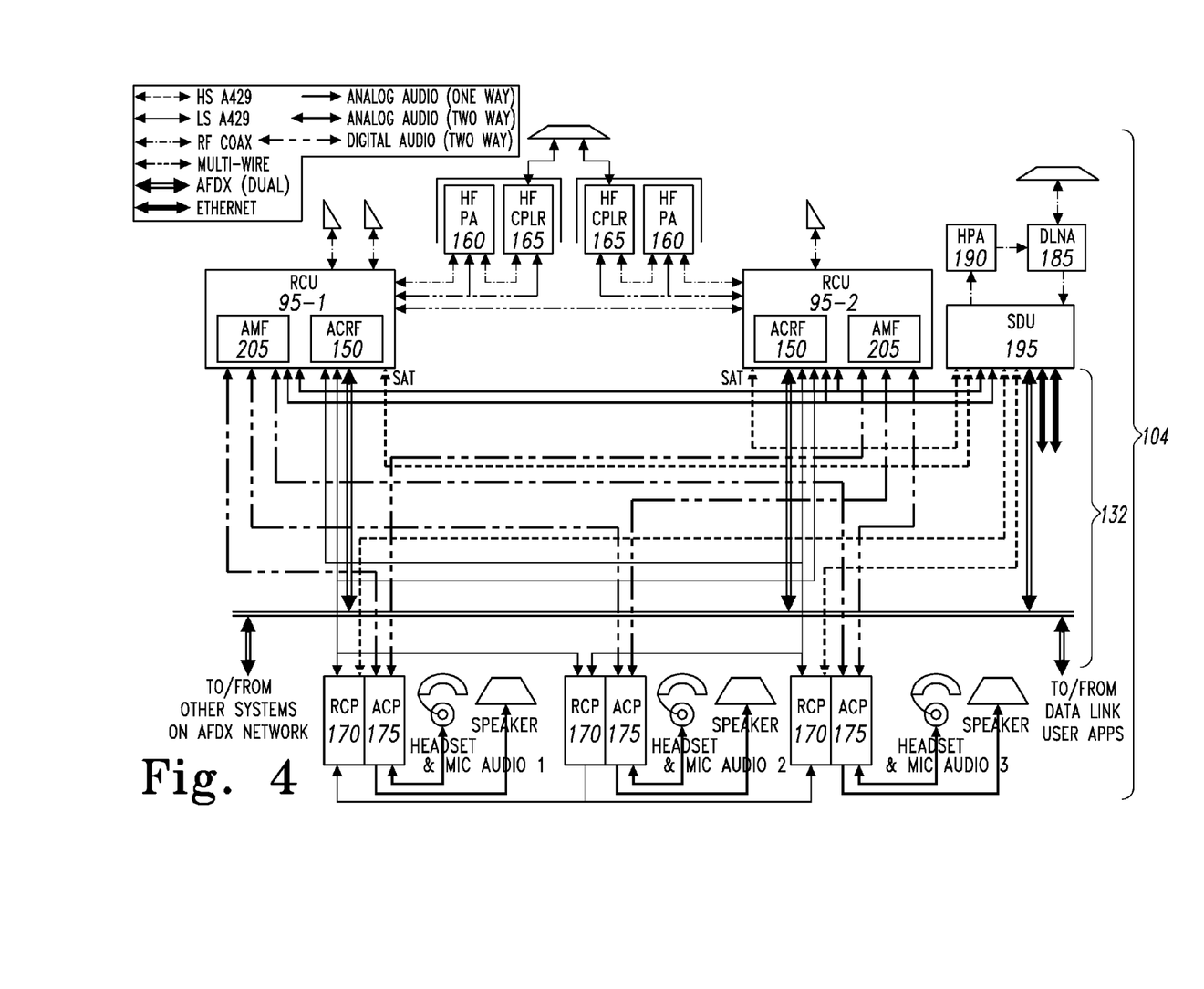
FIG. 4 is a block diagram of a radio communication system in accordance with one embodiment of the present invention that utilizes the reconfigurable radio communication subsystem of FIG. 1.

FIG. 4 is a block diagram of a radio communication system 104 in accordance with another embodiment of the present invention that utilizes the radio communication subsystem 90 of FIG. 1. In the implementation shown in FIG. 4, a further reduction in the amount of wiring and a shortening of the length of the audio wires to the headsets, microphones and speakers is obtained by using digital buses between the radio communication units 95(1-2) and the audio control panels (or audio control function of a radio management panel). Thus, the radio communication system 104 has even fewer communication links than the radio communication system 101 shown in FIG. 3. Because of the use of digital audio buses instead of point-to-point analog audio interconnections between the radio communication units 95(1-2) and the cockpit audio system components, there is less wiring represented generally at 132 used in the radio communication system 104 than in the wiring 131 in the radio communication system 101.

In this implementation, a digital bus connection between the audio management function 205 of each radio communications unit 95(1-2) and digital audio control panel 172 multiplexes and delivers the audio selection control data and the audio for one or more headsets, microphones and speaker jacks on the audio control panel. The headset, microphone and speakers are connected to the digital audio control panel 172 via short audio lines within the cockpit, instead of being connected via relatively long audio lines to the audio management function 205-1 or 205-2 in the radio communication unit 95-1 or 95-2, respectively.

Figure 5:
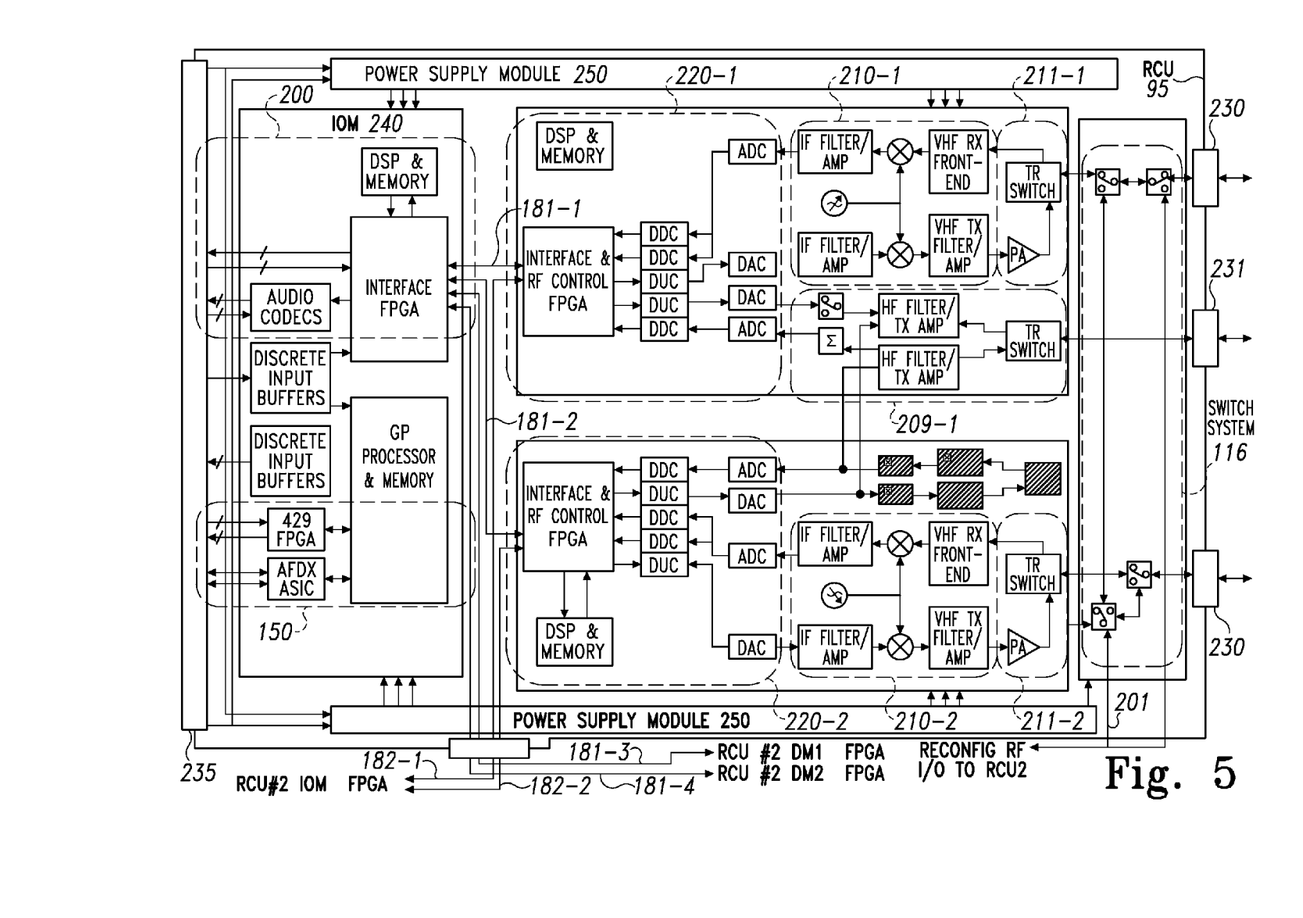
FIG. 5 is a block diagram of the internal architecture of one embodiment of a radio communication unit in the radio communication system of FIGS. 3 and 4.

FIG. 5 is a block diagram of one embodiment of the internal architecture of a radio communication unit 95 (FIG. 1) in the radio communication systems 101 and 104 of FIGS. 3 and 4, respectively. FIG. 5 shows the components that comprise the VHF transceiver 210-1, the VHF transceiver 210-2, and the HF transceiver 209. FIG. 5 also shows an exemplary VHF antenna switch system 116. VHF transceivers 210-1 and 210-2 are communicatively coupled to the two VHF power amplifiers 211-1 and 211-2, respectively. The VHF power amplifiers 211-1 and 211-2 are each connected to an external VHF antenna port 230. VHF transceivers 210-1 and 210-2 each include a receiver and a transmitter section.

Each input/output module 240 comprises a programmable digital signal processor, a programmable general purpose processor, memory, complex programmable logic device(s), analog audio coding/decoding devices, application specific integrated circuit to interface to a broadband avionics data bus (e.g. AFDX transceiver), ARINC 429 serial bus transceivers, miscellaneous external input/output circuitry and application software to perform various functions described herein.

In one embodiment, the receiver section of the VHF transceivers 210-1 and 210-2 is configured to amplify the received VHF signals in the 118-156 MHz range and to reject any interfering signals outside the 118-156 MHz band prior to digitization. In this case, the HF transceivers 210(1-4) each include a wideband receiver, a band selection filter/low noise amplifier front end, a transmitter/exciter, an image/spurious rejection/emissions control filtering section, and a frequency band translator. The wideband receiver is capable of simultaneously receiving all channels in the 118-156 MHz band or a portion of the band. The frequency band translator translates the received frequencies to an intermediate band of frequencies or to baseband in-phase and quadrature signals followed by image rejection/anti-alias filtering and amplification. The transmitter/exciter is capable of transmitting on any 25 kHz or 8.33 kHz channel in the 118-156 MHz band. In other embodiments, the VHF receiver section omits the frequency translation section of the receiver and the frequency is translated to baseband or a near zero intermediate frequency.

In another implementation of this embodiment, the high frequency transceivers 210(1-2) each include a wideband receiver, a band selection/low noise amplification section, a power splitter, and a transmitter/exciter, an input select switch, and an image rejection/emissions control filtering and pre-amplification section. In an exemplary case, the wideband receiver simultaneously receives all channels in the 2-30 MHz band, and the transmitter/exciter transmits on any 3 kHz channel in the 2-30 MHz band.

In another implementation of this embodiment, the transmitter section of the VHF transceiver 210 translates an intermediate frequency (IF) carrier that has been digitally amplitude modulated with voice audio or phase modulated with digitally encoded data to a frequency in the 118-156 MHz range. In this case, the VHF transmitter includes an IF filter/amplifier section, which rejects images of the IF carrier and spurious signals generated by the digital to analog conversion. The IF filter/amplifier section is followed by a frequency translator (mixer), which converts the IF frequency to the desired VHF carrier frequency. The frequency translator (mixer) is the followed by a low power VHF filter/amplifier section, which provides a cleaner VHF signal to the VHF power amplifier 211. While this embodiment of the VHF transmitter employs a frequency translator from an intermediate frequency to the desired VHF carrier frequency in the 118-156 MHz band, other transmitter implementations are possible. In one exemplary embodiment, the VHF transmitter provides a direct frequency translation from baseband to the desired VHF carrier frequency. In another exemplary embodiment, the VHF carrier is generated digitally and the frequency translation section of the transmitter is omitted.

In yet another implementation of this embodiment, the VHF power amplifiers 211-1 and 211-2 include a linear amplifier with nominal 25 Watt average output power followed by a harmonic rejection filter (not shown in FIG. 5) and a transmit/receive switch that is controlled by the digital signal processing modules 220-1 or 220-2. Each VHF transmitter and the respective VHF power amplifiers 211-1 and 211-2 are configured to transmit on one VHF channel. Each radio communication unit 95 also includes a single wideband HF transceiver 209 connected to an associated external HF power amplifier 160, and HF antenna coupler 165 (FIG. 3) via HF PA/Coupler port 231. HF transceiver 209 includes a receiver and a transmitter section. In one implementation of this embodiment, the receiver section of HF transceiver 209 amplifies the received HF signals in the 2-30 MHz band and rejects any out-of-band interfering signals prior to digitization. In this case, the receiver includes a low noise HF filter/amplifier front-end section and a power splitter that provides the received signal to both digital signal processing modules 220 as shown in FIG. 5.

In yet another implementation of this embodiment, the transmitter section of HF transceiver 209 provides a low power amplification of a digitally generated HF signal in the 2-30 MHz range that is single side-band modulated by voice audio or data. In this case, the transmitter includes a switch that selects the HF signal to be transmitted from one of the digital signal processing modules 220(1-2) followed by a low power HF filter/amplifier section that rejects images of the HF signal generated by the digital to analog conversion and a transmit/receive switch that is controlled by the digital signal processing module (not shown in FIG. 5). The wideband HF transceiver can be configured to transmit on one HF channel at a time or to receive one, two or more HF channels simultaneously. The number of VHF and HF channels that can be received simultaneously is limited only by the simultaneous processing capabilities of the digital signal processor modules 220(1-2) as described in detail below.

In addition, each radio communication unit 95 employs two digital signal processor modules 220-1 and 220-2 that are configured to generate the VHF and HF transmit digital waveforms in software and to digitize, perform receive channel selection and adjacent channel/in-band interference rejection, demodulate, and decode the received VHF and HF signals. In one implementation of such an embodiment, each digital signal processor module 220 includes two analog-to-digital converters (ADC), two digital-to-analog converters (DAC), two or more digital down-converters (DDC), two digital up-converters (DUC), a digital signal processor and memory and a field programmable gate array (FPGA).

In this case, one ADC digitizes the filtered and conditioned IF signal provided by one of the VHF receivers while the second ADC digitizes the filtered and conditioned HF signal provided by the HF receiver. The analog-to-digital converters digitize the signals from the receive section of one wideband very high frequency transceiver and the receive section of one wideband high frequency transceiver. The digital-to-analog converters convert the modulated digital high frequency and very high frequency carriers into RF signal inputs to the transmit section of one high frequency transceiver and the transmit section of one very high frequency transceiver.

Similarly, one DAC converts a digitally generated modulated IF carrier into an analog input to one of the VHF transmitters and the second DAC converts a digitally generated modulated HF signal into an analog input to the HF transmitter. Each digital signal processor module 220 simultaneously processes one, two, or more VHF transmit/receive channels and one HF transmit/receive channel depending on the number of programmable digital down-converters (DDC) and the processing capabilities of the digital signal processor. In the embodiment of FIG. 5, each digital signal processor module 220 is configured with 3 digital down-converters, two of which are allocated for channel selection and adjacent channel/in-band interference rejection of two VHF channels. The third digital down-converter is allocated for channel selection and adjacent channel/in-band interference rejection of one HF channel. Each digital signal processor module 220 is also configured with 2 digital up-converters (DUCs), one of which is allocated for modulation of one VHF carrier and the other of which is allocated for modulation of one HF carrier. While this embodiment of the digital signal processing module 220 employs DDCs for received channel selection and DUCs for transmit carrier modulation, other possible implementations could replace the DDCs and DUCs with digital filters if the receivers and transmitters interface signals are baseband in-phase and quadrature signals.

Application software executed by the digital signal processor performs simultaneous encoding and/or demodulation, decoding and/or audio signal processing of the two VHF channels and one HF channel. Application firmware executed in a field programmable gate array (FPGA) performs the control of the VHF and HF transceivers configuration (not shown in FIG. 5) and the interfacing to the input/output modules 240 in radio communication units 95-1 and 95-2. At least one programmed complex programmable logic device performs the following operations: 1) the digital down conversion and channel selection, 2) adjacent channel and in-band interference rejection for one high frequency receive channel and at least one (but preferably two) very high frequency receive channels.

A programmable digital signal processor executes software stored in a memory in order to provide the capability of simultaneously performing all the functions required to transmit voice signals or data messages on one very high frequency channel or to receive voice signals or data messages on at least one very high frequency channel (and preferably two to allow for receiver and digital signal processor continuous fault monitoring) and to simultaneously perform all the functions required to transmit or receive voice signals or data messages on one high frequency channel. At least one programmed complex programmable logic device interfaces the input/output modules 240 to the digital signal processor 220(1-2) and to the very high frequency and high frequency transceivers (210(1-2) and very high frequency antenna switch system 116.

Each radio communication unit 95 also includes an input/output module (IOM) 240. The input/output module 240 includes an interface field programmable gate array (FPGA), a general purpose (GP) processor, a digital signal processor (DSP), multiple audio coder/decoders (CODEC), discrete input buffers, discrete output drivers, multiple ARINC 429 transceivers implemented in firmware executed by an FPGA, and an avionics full duplex Ethernet (AFDX) application-specific integrated circuit (ASIC) with dual input/outputs. The general purpose processor in input/output module 240-1 in radio communications unit 95-1 (FIG. 1) and the general purpose processor in input/output module 240-2 in radio communications unit 95-2 (FIG. 1) are communicatively coupled via cross-connect bi-directional bus 180 (FIG. 1) to manage and control the reconfiguration of the radio communications subsystem 90.

Application software executed in the digital signal processor performs the audio management function 200 by: 1) processing the digitized audio received from each VHF and HF voice function via the interface FPGA to perform selective call (SELCAL) decoding and generating call annunciation signals; 2) processing the analog audio received from the SATCOM radio voice functions (i.e., the SATCOM data unit (SDU) 195 in FIGS. 3 and 4); and 3) routing the audio selected for each headset and speaker in the cockpit and call annunciation signals. In the exemplary radio communications system 101 shown in FIG. 3, the audio is routed to the headsets and speakers via the CODECs. In the exemplary radio communications system 104 shown in FIG. 4, the audio is routed via the digital audio buses. Similarly, when the operator in the cockpit presses the push-to-talk (PTT) and speaks into a microphone, the audio management function 200 routes the audio received from the microphone whose PTT is active to the VHF or HF voice function that has been selected for that microphone via the appropriate internal digital bus interface 181(1-4) or 182(1-4) (FIG. 1) or via an analog audio interface controlled by the interface FPGA if a SATCOM voice function has been selected.

While the audio management function 200 and 205 depicted in FIGS. 3 and 4, respectively, of this embodiment show only interfaces to VHF, HF and SATCOM radio voice audio communications functions, the audio management function can be expanded to include routing/switching of audio input/outputs from the cabin intercom system as well as routing/switching of audio inputs from navigation radios such as Instrument Landing System (ILS), Automatic Direction Finding (ADF), VHF Omni-directional Ranging (VOR) and Distance Measuring Equipment (DME) receivers and audio inputs from surveillance radios such as Transponder Collision Avoidance System (TCAS) in the same way SATCOM audio inputs are handled. The only requirement is additional audio CODECs to handle those interfaces (not shown). A related application software program executed in the general purpose processor monitors and processes the commands received from the audio control panels 175 (FIG. 3) or 172 (FIG. 4) via ARINC 429 or other suitable interfaces to configure the routing of audio signals between microphones, headsets, speakers and VHF, HF and SATCOM voice functions.

In summary, application software executed in the digital signal processor performs the audio management function 200 by:

1) monitoring commands received from radio communications panels in the cockpit that select the mode of operation (voice or data) of the three VHF and two HF functions and select the channel frequency for each VHF and HF function that is operating in voice mode, and using this data to configure each VHF transceiver and HF transceiver via the serial bus interfaces to the digital signal processing modules;

2) monitoring for VHF data link mode and frequency change commands received from an internal "avionics data communications router function" software application or from an external avionics data communications router unit, and using this data to configure the VHF transceiver that is operating in data mode;

3) monitoring for and discarding duplicate uplink messages received from the VHF and HF functions that are operating in data mode, delivering the uplink messages that are not discarded to an internal "avionics data communications router function" software application or to an external avionics data communications router unit via the appropriate interfaces, and forwarding the downlink messages received from the internal "avionics data communications router function" software application or from an external avionics data communications router unit to the appropriate VHF or HF function;

4) monitoring for and discarding duplicate received voice audio streams from VHF and HF functions that are operating in voice mode, delivering the voice audio streams that are not discarded to an internal "audio management function" software application or to external audio management units via the appropriate audio interfaces, and forwarding of voice audio streams received from internal "audio management function" software application or from external audio management units to the appropriate VHF and HF functions;

5) monitoring of health/fault status data provided by each VHF and HF transceiver and digital signal processing module, monitoring for unexpected loss of duplicate copies of received audio and received data link messages, and monitoring transmit signal levels to detect faults in on-line VHF transceivers, HF transceivers and digital signal processors;

6) reconfiguring the spare VHF transceiver and digital signal processing module to take over the functions performed by a failed VHF transceiver or digital signal processing module; and 7) reconfiguring of the assignment of VHF functions and HF functions and power supply inputs when two or more faults result in loss of more than one VHF transceiver, digital signal processor, or internal power supply in order to assign the highest priority functions (e.g. VHF1 function) to the surviving modules and in order to switch to the 28V Emergency Supply input when only one power supply module is available in a radio communications unit.

A second application software program executed in the general purpose processor performs the avionics data communications router function 150 by: 1) processing uplink data messages received from the VHF and HF data functions via the interface FPGA; 2) processing uplink data messages received from the SATCOM radio data function (i.e., the SATCOM data unit (SDU) 195 in FIGS. 3 and 4) via the ARINC 429 interface; and 3) delivering those messages to the appropriate data link user applications hosted on other systems on-board the aircraft via the AFDX interface. Similarly downlink data messages received from the data link user applications via the AFDX interface are routed to the appropriate VHF, HF or SATCOM data function based on routing policies implemented by the avionics data communications router function 150.

In summary, software applications are hosted in each input/output module 240(1-2) so that an avionics data communications router function is operable to:

1) route uplink data link messages received from the very high frequency and the high frequency transceivers that are operating in data mode and uplink data link messages received from an external SATCOM transceiver to data link user applications that reside in external end-systems using the appropriate interfaces;

2) route downlink data link messages received from the external data link user applications to the appropriate very high frequency or high frequency transceiver that is operating in data mode or to external SATCOM transceiver based on pre-determined routing policies via appropriate interfaces; and 3) exchange command and control data with an external control device (e.g. radio control panels) used for customization of the router policies.

And yet a third application software program executed in the general purpose processor is operable to: 1) monitor and process the commands received from the radio control panels 170 via ARINC 429 interfaces to configure the voice or data function assignments for the three VHF and two HF functions and to configure the operating frequency (channel) for each VHF and HF voice function; 2) monitor and report system faults; and 3) coordinate with the peer application executing in the other radio communications unit via cross-connect bi-directional bus 180, 181(3-4), and/or 182(1-2) to perform reconfiguration of the radio communications unit functions in the event of a fault as described in the related '468 Application and as further described in this application.

Additional software applications are hosted in each input/output module 240(1-2) so that an audio management function is operable to:

1) monitor audio selection commands received from audio control panels in the cockpit to select the VHF, HF or SATCOM or navigation or surveillance radio audio to be directed to each headset and speaker in the cockpit and to select the VHF, HF or SATCOM transceiver to which the audio received from each microphone in the cockpit is to be directed;

2) perform "selective call" (SELCAL) decoding on each of the audio streams received from each internal VHF and HF transceiver that is operating in voice mode to detect "calls" addressed to the aircraft and provide call annunciation signals to the audio control panels in the cockpit via the appropriate interface;

3) route the voice audio received from each internal VHF and HF transceiver that is operating in voice mode and from external SATCOM voice transceiver, navigation and surveillance radios to the selected headset or speaker using the appropriate interfaces or discards the audio if not selected for delivery to any headset or speaker; and 4) monitor the push-to-talk discrete inputs from each microphone in the cockpit and routes the audio from each microphone whose push-to-talk is "active" to the selected VHF, HF or SATCOM transceiver using the appropriate interfaces.

The wideband nature of the VHF receiver sections of 210 (1-4) and HF receiver sections of 209, and the capability of the digital processing modules 220(1-4) to process 2 VHF channels and 1 HF channel each, provide are 8 VHF receive functions and 4 HF receive functions between radio communications unit 95-1 and radio communications unit 95-2. Since only 3 VHF functions and 2 HF functions need be provided, the spare receive functions can be used for on-line receiver fault monitoring and fault detection.

One possible implementation of the assignment of spare receiver resources for fault monitoring is as follows: VHF transceiver 210-1 and digital signal processing module 220-1 are assigned to perform VHF1 and VHF2 receive functions; similarly, VHF transceiver 210-2 and digital signal processing module 220-2 are assigned to perform VHF2 and VHF3 receive functions; VHF transceiver 210-3 and digital signal processor 220-3 are assigned to perform VHF1 and VHF3 receive function; and VHF transceiver 210-4 and digital signal processor 220-4 are 'hot spares' to be brought on-line when a failure is detected in one of the VHF transceiver/digital signal processor pairs. In addition, HF transceiver 209-1 and digital signal processor 220-1 are assigned to perform the HF1 receive function while the HF transceiver 209-1 and digital signal processor 220-2 are assigned to perform the HF2 receive function. Similarly, HF transceiver 209-2 and digital signal processor 220-3 are also assigned to perform the HF1 receive function while HF transceiver 209-2 and digital signal processor 220-4 are also assigned to perform the HF2 receive function. In this implementation, the audio signals received by each VHF receiver and HF receiver operating in voice, and the data messages received by each VHF receiver and HF receiver operating in data mode are delivered to the input/output module 240-1 via the buses 181(1-4) and to the input/output module 240-2 via the buses 182(1-4) along with received signal quality information.

When all receivers and digital signal processing modules are operating normally, each input/output module 240 will receive duplicate audio streams and data messages. In this case, each input/output module discards the duplicate audio or data message with the lowest received signal quality, delivers the higher quality audio to the audio management function 200, and delivers the higher quality data message to the avionics data communications router function 150. When a failure occurs in a VHF receiver, a HF receiver, or a digital signal processing module, the input/output modules 240 receive at least one of the following:

1) a single copy of the received audio;
2) data from two of the VHF functions;
3) a single copy of the received audio;
4) data from both HF functions,
5) a single copy of the received audio, or
6) data from two HF functions and one HF function. Thus, hard failures in the VHF and HF receivers and digital signal processing modules can be detected without loss of functionality. Failures in the transmitter sections of the VHF transceivers 210, VHF power amplifiers 211 and HF transmitter sections of the HF transceivers 209 can be detected by monitoring the output power of each transmitter/power amplifier during transmission. In this case there will be a temporary loss of transmit function capability until the 'hot spare' VHF transceiver and digital signal processing module are brought on line as described in the related '468 Application.

Thus, when a failure is detected in one of the VHF transceivers 210(1-3) (FIG. 1), the amplifiers 211(1-3) or the digital signal processing modules 220(1-3), the VHF antenna switch systems 116-1 and 116-2 are reconfigured to disconnect the failed VHF transceivers/amplifier/digital signal processing module trio from the antenna and to connect the standby VHF transceivers/amplifier/digital signal processing module to that antenna.

Each radio communication unit 95 also includes two internal power supply modules 250 that generate the internal voltages required by the input/output module 240, digital signal processor modules 220, HF transceiver 209, VHF transceivers 210, and VHF power amplifiers 211. Each internal power supply module 250 provides power to one digital signal processor module 220, one HF transceiver 209, one VHF transceiver 210 and one VHF power amplifier 211 at a time. The input/output module 240 is provided power by either of the two internal power supply modules 250 to ensure that an internal power supply failure does not result in loss of all the functions performed by the radio communications unit 95. In one implementation of this embodiment, the internal power supply modules 250 can be configured to either be powered from the Normal or from the Emergency 28V power supply inputs provided by the aircraft power generation system. Under normal operating conditions one power supply is configured to be powered from the aircraft Normal 28V supply input while the other is configured to be powered from the Emergency 28V supply input. In the event of a failure of one of the internal power supply modules 250, the remaining internal power supply module 250 will switch to take its aircraft power input from the Emergency 28V supply if not already so configured. This also ensures that in the event of total loss of aircraft power when only the Emergency 28V supply input is available, one VHF function will be available.

In order for the radio communication subsystem 90 (FIG. 1) to be fault tolerant (no loss of any VHF, HF or SATCOM function) to any single failure in a radio communication unit 95-1 or 95-2, or any single failure in a HF antenna subsystem 120-1 or 120-2, the input/output modules 240 (FIGS. 1 and 5), in each radio communication unit 95-1 and 95-2 are communicatively coupled to the VHF and HF functions in both radio communication units 95 via separate point-to-point serial data buses, such as buses 181(1-4) and 182(1-4) in FIG. 1. Since the radio communication system 101 is only required to support simultaneous operation of three VHF functions and two HF functions, the dual radio communication unit architecture with four VHF functions and two HF functions per radio communication unit 95-1 and 95-2 tolerates a failure in one of the modules that support a VHF and a HF function without loss of any of the three VHF or two HF functions.

The HF antenna subsystems 120(1-2) each include a HF power amplifier 160 and an HF coupler 165. In one implementation of this embodiment, the HF power amplifier 160 and HF coupler are included in a single hermetically sealed enclosure that acts as a heat sink for the amplifier. In another implementation, the HF power amplifier 160 and HF coupler 165 are in separate hermetically sealed enclosures suitable for installation in different locations. In either case, the HF power amplifier 160 includes a linear power amplifier with nominal 100 Watts average output power, transmit/receive switches (not shown), and an internal power supply (PS) module that generates the internal voltages required by the HF power amplifier 160 and the HF coupler 165 from an external 115 VAC or 28 VDC power supply input from the aircraft power generation system. When the transmit/receive switches are in the receive position, the power amplifier function is by-passed.

In one implementation of this embodiment, the HF coupler 165 includes a microprocessor controlled impedance matching network, a broadband low-noise receive amplifier and transmit/receive switches. When the transmit/receive switches are in the transmit position, the HF coupler 165 is configured to adaptively match the HF antenna complex impedance and to present 50 ohms load impedance to the HF power amplifier 160. The HF antenna coupler 165 is able to match a wide range of antenna impedances with resistive and reactive components ranging from a fraction of an ohm to a few thousand ohms. The impedance matching function of the HF coupler 165 has a fast tuning mode and a learning mode. The fast tuning mode is used when the impedance match settings at the selected operating frequency have been previously saved in non-volatile memory. The learning mode is used when there is no impedance match settings saved in memory or if the settings no longer produce a match with low VSWR. When the transmit/receive switches are in the receive position the impedance matching network is by-passed and the broadband low noise receive amplifier is connected to the antenna in order to receive signals across the entire 2-30 MHz band.

The wideband reception capability of the receiver section of HF transceiver 209 (FIG. 5) along with dual digital signal processor modules 220 in each radio communication unit architecture with each digital signal processor module capable of demodulating one HF channel and the by-pass operation of the HF power amplifier 160 and broadband reception capability of the HF coupler 165 allows simultaneous reception of two HF channels with a single HF power amplifier 160 (FIG. 3) and HF coupler 165 (FIG. 3) in the event of a failure of the other HF power amplifier 160 and/or HF coupler 165. The fast tuning with memory and learning modes of operation of the HF coupler's antenna impedance matching function along with the capability to digitally generate one modulated HF signal in each digital signal processor module 220 allows fast switching between transmission on one HF channel and a second HF channel even when one HF power amplifier 160 and/or HF coupler 165 has failed and the system must operate with a single HF power amplifier 160/HF coupler 165 pair. Thus, a single failure in an HF amplifier 160 or HF coupler 165 does not result in loss of any of the radio communications functions.

Figure 6:
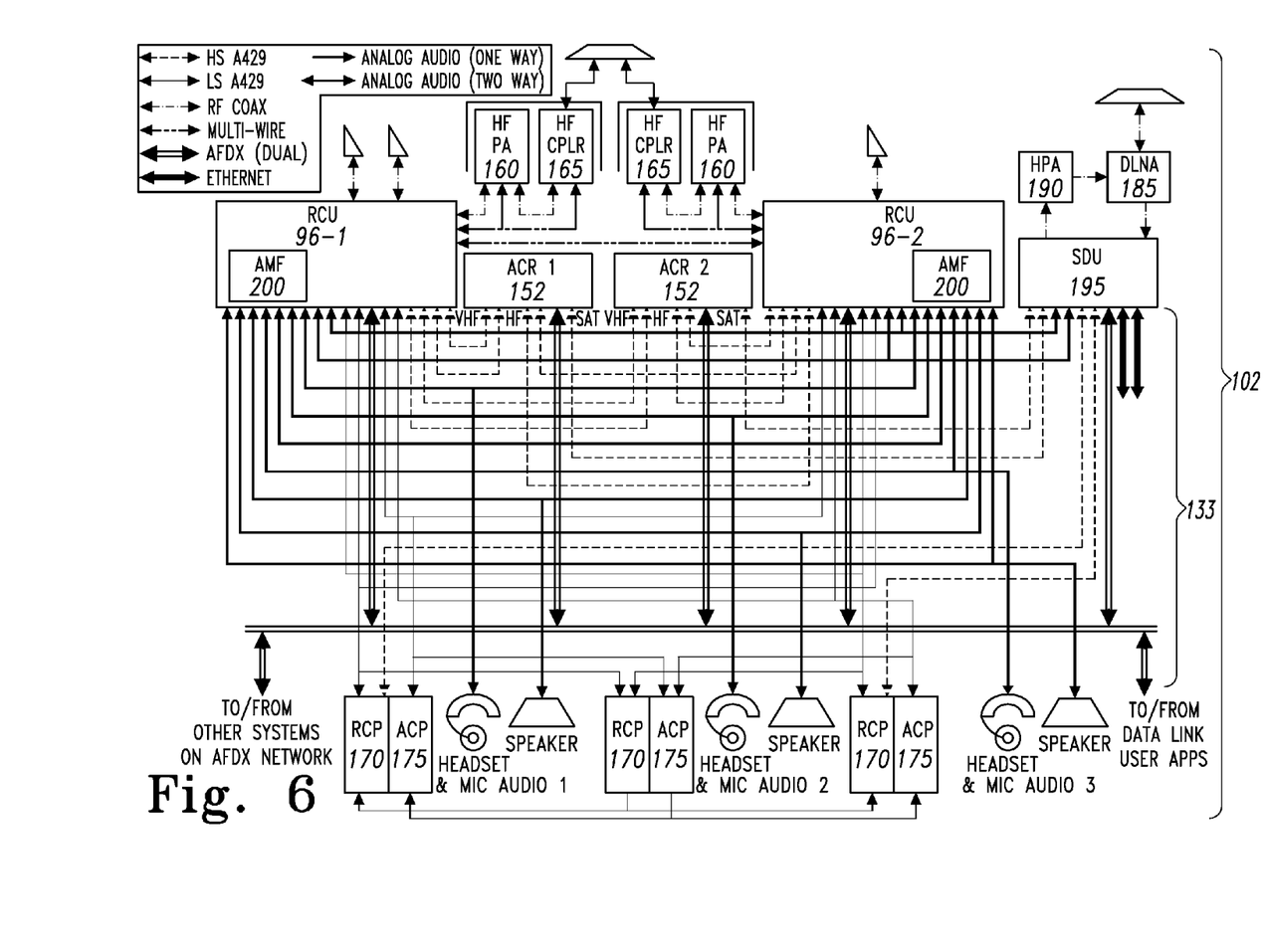
FIGS. 6-8 are block diagrams of radio communication systems in accordance with alternative embodiments of the present invention.
Figure 7:
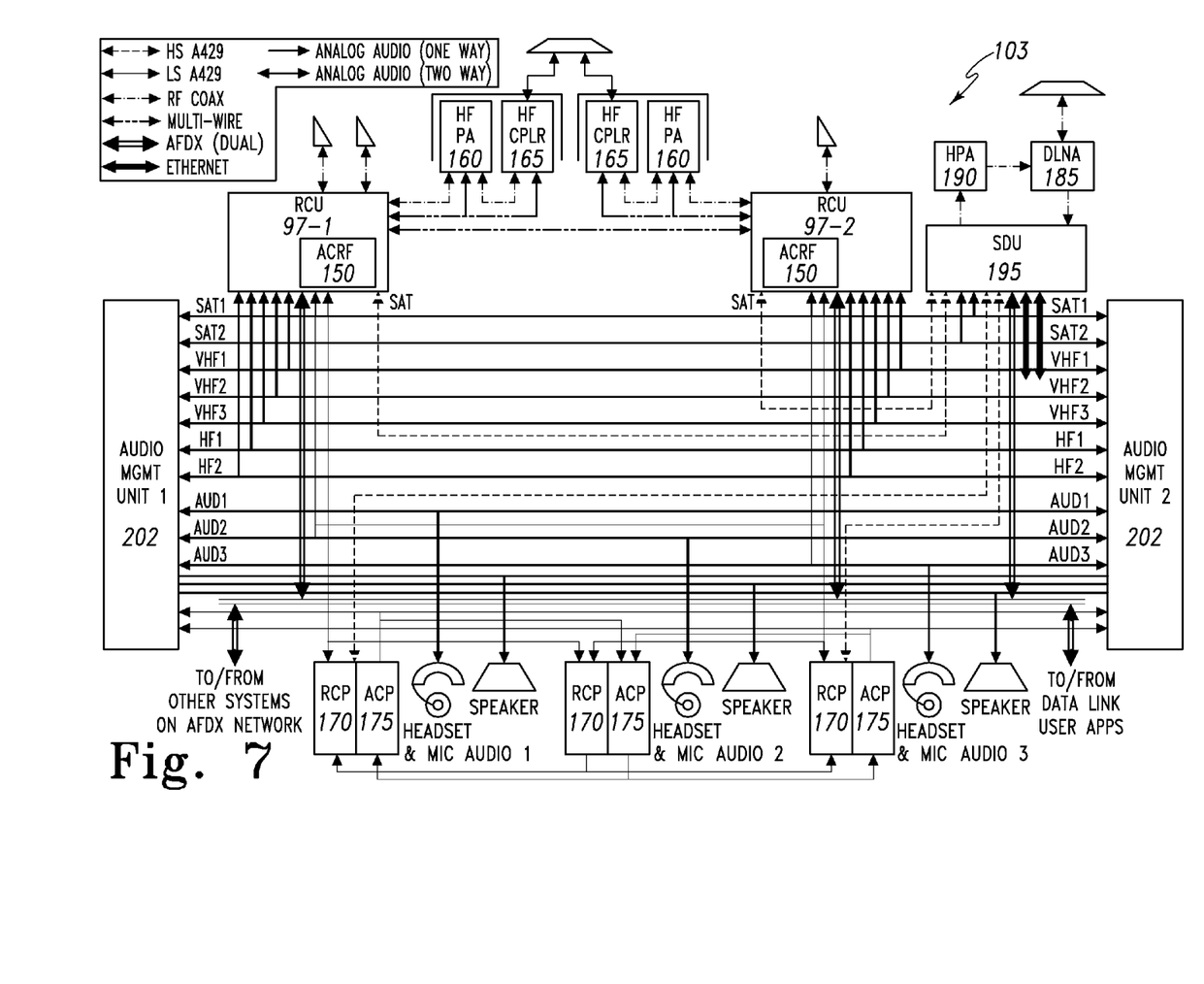

FIGS. 6-7 are block diagrams of radio communication systems in accordance with other embodiments of the invention depicted in FIG. 1. FIG. 6 is a diagram showing the point-to-point audio interconnections and serial data buses represented generally at 133 in radio communication system 102. The radio communication system 102 differs from the radio communication system 101 shown in FIG. 3, in that the avionics data communications router 152 that replaces the avionics data communications router function 150 is located outside the radio communication units 96-1 and 96-2. The communication links that connect the avionics data communications router 152 to the radio communication units 96-1 and 96-2 and to the AFDX network are shown. More communication links are required in the radio communication system 102 than in the radio communication system 101 (FIG. 3); fewer communication links are required in the radio communication system 102 than in the radio communication system 100 (FIG. 2).

FIG. 7 is a diagram showing the point-to-point audio interconnections and serial data buses represented generally at 134 in radio communication system 103. The radio communication system 103 differs from the radio communication system 101 shown in FIG. 3, in that the audio management unit 202 that replaces the audio management function 200 is located outside the radio communication units 97-1 and 97-2. The communication links that connect the audio management unit 202 to the radio communication units 97-1 and 97-2 and to the headsets, microphones, speakers and audio communications panels 175 are shown. More communication links are required in the radio communication system 103 than in the radio communication system 101 (FIG. 3); fewer communication links are required in the radio communication system 103 than in the radio communication system 100 (FIG. 2).

Figure 8:
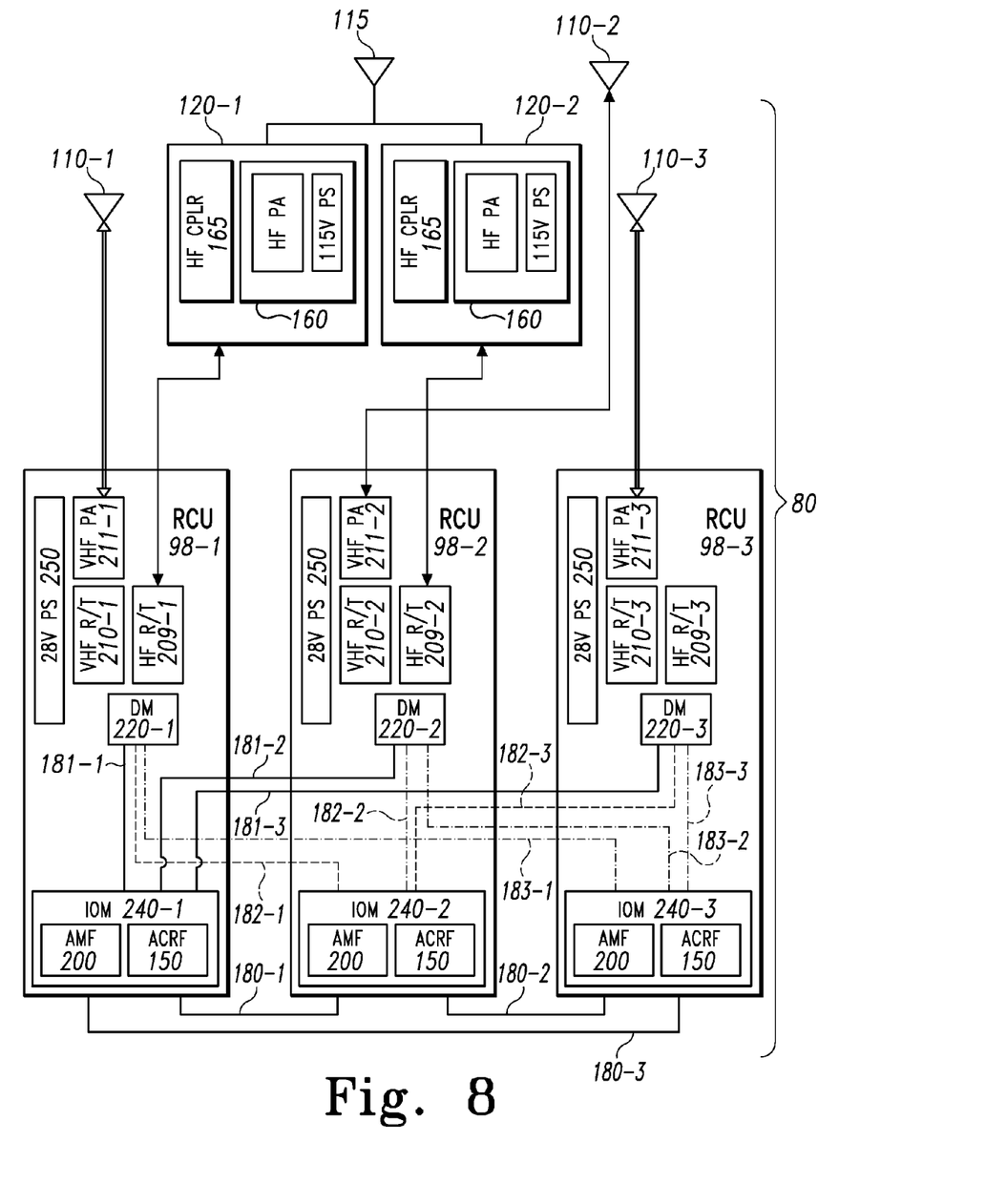

FIG. 8 shows an embodiment in which where the radio communications subsystem 80 consists of three radio communications units 98(1-3) each including one very high frequency transceiver 210, one very high frequency power amplifier 211, one high frequency transceiver, one digital signal processing module 220, one input/output module 240, one power supply 250. In this embodiment, the cross-connecting buses 180(1-3), 181(1-3), 182(1-3) and 183(1-3) among the radio communications units 98(1-3) manage the reconfiguration of the radio communication subsystem 80. The components in the radio communication subsystem 80 are configured and operational as described above with reference to FIGS. 3-5. The bus connections 180(1-3), 181(1-3), and 182(1-3) and the operation of the radio communication units 98(1-3) as shown in FIG. 8 are understandable for one skilled in the art based on a reading of this document. This embodiment is suitable for aircraft installations where only two very high frequency functions are required for dispatch and higher availability of the audio management function is needed.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A reconfigurable radio communication subsystem, comprising:
    a first radio communication unit communicatively coupled to a first antenna and a second antenna, the first and second antennas operable in a first frequency band;
    a second radio communication unit communicatively coupled to a third antenna and either one of the first antenna or the second antenna, the third antenna operable in the first frequency band;
    a first antenna subsystem communicatively coupled to the first radio communication unit and communicatively coupled to a fourth antenna operable in a second frequency band; and
    a second antenna subsystem communicatively coupled to the second radio communication unit and communicatively coupled to the fourth antenna;
    wherein the first and second radio communication units each include:
        one or more reconfigurable voice/data functions operating in the first frequency band;
        one or more voice/data functions operating in the second frequency band; and
        a radio communications system management function,
    wherein the first radio communication unit and the second radio communication unit each further include one of:
    an avionics data communications router function;
    an audio management function; or
    both the avionics data communications router function and the audio management function, and wherein cross-connecting buses communicatively coupled the first radio communication unit and the second radio communication unit.

2. The reconfigurable radio communication subsystem of claim 1, wherein the first frequency band is a very high frequency band, the second frequency band is a high frequency band,
    wherein the first antenna, is a first very high frequency antenna, the second antenna is a second very high frequency antenna, the third antenna is a third very high frequency antenna and the fourth antenna is a high frequency antenna,
    wherein the reconfigurable voice/data functions operating in the first frequency band are reconfigurable VHF radio functions,
    wherein the voice/data functions operating in the second frequency band are HF radio functions, and
    wherein the first antenna subsystem is a first high frequency antenna subsystem, and the second antenna subsystem is a second high frequency antenna subsystem.

3. The reconfigurable radio communication subsystem of claim 2, wherein the first and second radio communication units each further comprise:
    two very high frequency transceivers at least one of which is communicatively coupled to at least one of the very high frequency antennas;
    two very high frequency power amplifiers communicatively coupled to a respective one of the very high frequency transceivers; and
    a high frequency transceiver communicatively coupled to the high frequency antenna.

4. The reconfigurable radio communication subsystem of claim 3, wherein the first and second radio communication units each further comprise a switch system that is communicatively coupled to the very high frequency power amplifiers in the respective radio communication units.

5. The reconfigurable radio communication subsystem of claim 4, wherein the first and second radio communication units each further comprise two digital signal processing modules each associated with a respective one of the very high frequency transceivers and each digital signal processing module associated with the high frequency transceiver.

6. The radio communication subsystem of claim 5, wherein the first and second radio communication units each further comprise:
an input/output module to interface the very high frequency functions and the high frequency functions of the first and second radio communication units via serial communication bus connections to the two digital signal processing modules in each of the first and second radio communication units, and wherein the input/output modules in the first and second radio communication units are communicatively coupled to each other via at least one point-to-point serial data bus; and
at least one power supply module to power the input/output module, the digital signal processing modules, the high frequency transceiver, the very high frequency transceivers, and the very high frequency power amplifiers.

7. The radio communication subsystem of claim 2, wherein the first and second antenna subsystems each comprise:
a high frequency coupler communicatively coupled with the high frequency antenna; and
a high frequency power amplifier communicatively coupled to a respective one of the first and second radio communication units.

8. A radio communication unit, comprising:
an avionics communication router;
two very high frequency transceivers at least one of which is communicatively coupled to at least one very high frequency antenna;
two very high frequency power amplifiers communicatively coupled to a respective one of the high frequency transceivers;
a high frequency transceiver communicatively coupled to a high frequency antenna; and
two digital signal processing modules each associated with a respective one of the very high frequency transceivers and each digital signal processing module associated with the high frequency transceiver, wherein the avionics communication router routes data link messages received via the two very high frequency transceivers and the high frequency transceiver, the radio communication unit configured to send signals to and receive signals from another radio communication unit.

9. The radio communication unit of claim 8, further comprising:
a switch system that is communicatively coupled to the very high frequency power amplifiers.

10. The radio communication unit of claim 8, further comprising:
an input/output module to interface the very high frequency functions and the high frequency functions of the radio communication unit.

11. The radio communication unit of claim 8, further comprising:
at least one power supply module to power the input/output module, the digital signal processing modules, the high frequency transceiver, the very high frequency transceivers, and the very high frequency power amplifiers.

12. The radio communication unit of claim 8, further comprising:
an audio management unit configured to deliver audio signals to and from communication system radios having multiple very high frequency functions and high frequency functions.

13. A radio communication unit, comprising:
an audio management unit configured to deliver audio signals to and from radios having multiple very high frequency functions and high frequency functions;
two very high frequency transceivers at least one of which is communicatively coupled to at least one very high frequency antenna;
two very high frequency power amplifiers communicatively coupled to a respective one of the high frequency transceivers;
two digital signal processing modules each associated with a respective one of the very high frequency transceivers and each digital signal processing module associated with a high frequency transceiver; and
the high frequency transceiver communicatively coupled to a high frequency antenna, wherein the radio communication unit configured to send signals to and receive signals from another radio communication unit.

14. The radio communication unit of claim 13, further comprising:
a switch system that is communicatively coupled to the very high frequency power amplifiers.

15. The radio communication unit of claim 14, further comprising:
an input/output module to interface the very high frequency and high frequency functions of the radio communication unit.

16. The radio communication unit of claim 15, further comprising:
at least one power supply module to power the input/output module, the digital signal processing modules, the high frequency transceiver, the very high frequency transceivers, and the very high frequency power amplifiers.

17. The radio communication unit of claim 13, further comprising:
an avionics communication router wherein the avionics communication router routes data link messages received via the two very high frequency transceivers and the high frequency transceiver.

18. The radio communication unit of claim 17, further comprising:
an input/output module to interface the very high frequency and high frequency functions of the radio communication unit; and
at least one power supply module to power the input/output module.

* * * * *